United States Patent [19]

Kawai

[11] Patent Number: 4,774,538
[45] Date of Patent: Sep. 27, 1988

[54] FOCUS CONTROL METHOD AND CAMERA

[75] Inventor: Tohru Kawai, Kawasaki, Japan

[73] Assignee: Canon Kabushiki Kaisha, Tokyo, Japan

[21] Appl. No.: 871,786

[22] Filed: Jun. 9, 1986

[30] Foreign Application Priority Data

Jun. 14, 1985 [JP] Japan .................................. 60-129480
May 16, 1986 [JP] Japan .................................. 61-73440

[51] Int. Cl.⁴ .................................................. G03B 3/10
[52] U.S. Cl. ................................................... 354/402
[58] Field of Search .............................. 354/400–409, 354/195.1, 289.1, 289.12; 358/227

[56] References Cited

U.S. PATENT DOCUMENTS 4,027,317  5/1977  Hauser et al. ................. 354/289.1
4,531,158  7/1985  Murakami et al. ............. 358/227
4,623,237 11/1986  Kaneda et al. ................. 354/403

Primary Examiner—W. B. Perkey
Attorney, Agent, or Firm—Fitzpatrick, Cella, Harper & Scinto

[57] ABSTRACT

The present invention relates to a focus control method and a camera wherein the movement of a focus lens for adjusting the focus atate with respect to an object to be photographed is controlled in accordance with the the degree of blurring of the image resulting from camera vibration and the focal length of the lens.

18 Claims, 2 Drawing Sheets

FOCUS CONTROL METHOD AND CAMERA

BACKGROUND OF THE INVENTION

1. Field of the Invention

The present invention relates to a focus control method and a camera wherein the focus state with respect to an object to be photograghed is detected, and in accordance with the signal thus detected, the focus lens is moved to the in-focus position with respect to the object.

2. Description of the Related Arts

Cameras incorporating automatic focusing devices have become popular for use in daily life and recently the automatic focusing single-lens reflex camera, which offers high performance and high speed focusing operation has appeared. While, such a single-lens reflex camera has the advantage that different lenses can be used, when attempting to take a picture in a handheld fashion with a telephoto lens attached to the camera body, the object can easily become out of focus since the focus information which is detected by the focus detection device is likely to become uncertain due to movement of the operator's hand.

Moreover, in cameras having such a construction in which a focus operation is repeated several times before shutter release is completed, even if the object has once been brought into focus, the focus state can becom unstable due to the fluctuation of the focus information caused by movement of the operator's hands.

SUMMARY OF THE INVENTION

In view of the above-described background, an object of the present invention is to make it easy to precisely focus on an object, or, after focusing, to maintain the same focus state.

According to one aspect of the invention, there is provided a method for controlling the focus state of the optical system of a camera comprising the steps of, detecting the focal distance of the optical system, detecting the focused state of the optical system and, depending on the degree of out-of-focus, adjusting the focus of the optical system, detecting the vibration of the camera, and controlling the focus adjustment of the optical system in accordance with the level of vibration and the detected length.

An additional feature of this aspect of the invention is detecting the accumulation time of sensors for detecting the focus state and controlling the focus adjustment also in accordance with the detected accumulation time.

According to another aspect of the invention, there is provided a camera comprising an automatic focusing device having an optical system which is focused on an object in accordance with photoelectrically converted information about the object, means for detecting the camera vibration, means for detecting the focal length of said optical system, and control means for inhibiting the focusing operation of said focusing device in accordance with the vibration detected by said vibrating detecting means the focal length detected by said focal length detecting means.

An additional feature of this aspect of the invention is means for detecting the accumulation time of photoelectric sensors which output the photolectrically coverted information, such that the control means also operates in accordance with the detected accumulation time.

In accordance with yet another aspect of the invention, there is provided a camera comprising a focusing lens and a zoom lens, means for driving said focusing lens, means for detecting the focus state of said focusing lens and calculating an operation signal for said drive means, means for detecting blur of the object image and inhibit means for receiving the detected focal length of said zoom lens and the detected image blur and inhibiting said driving means from driving said focusing lens when the amount of blur is greater than a predetermined value for the detected focal length.

In accordance with still another aspect of the invention, there is provided a camera body comprising means for outputting a signal for automatically focusing a lens detachably mountable on said camera body, means for detecting the focus state of the lens, means for detecting the vibration of said camera body and inhibit means for receiving information on the focal length of the lens and the detected vibration and inhibiting the output of said automatic focusing signal when the amount of vibration is greater than a predetermined value for the focal length of the lens.

DESCRIPTION OF THE PREFERRED EMBODIMENT

Figure 1:
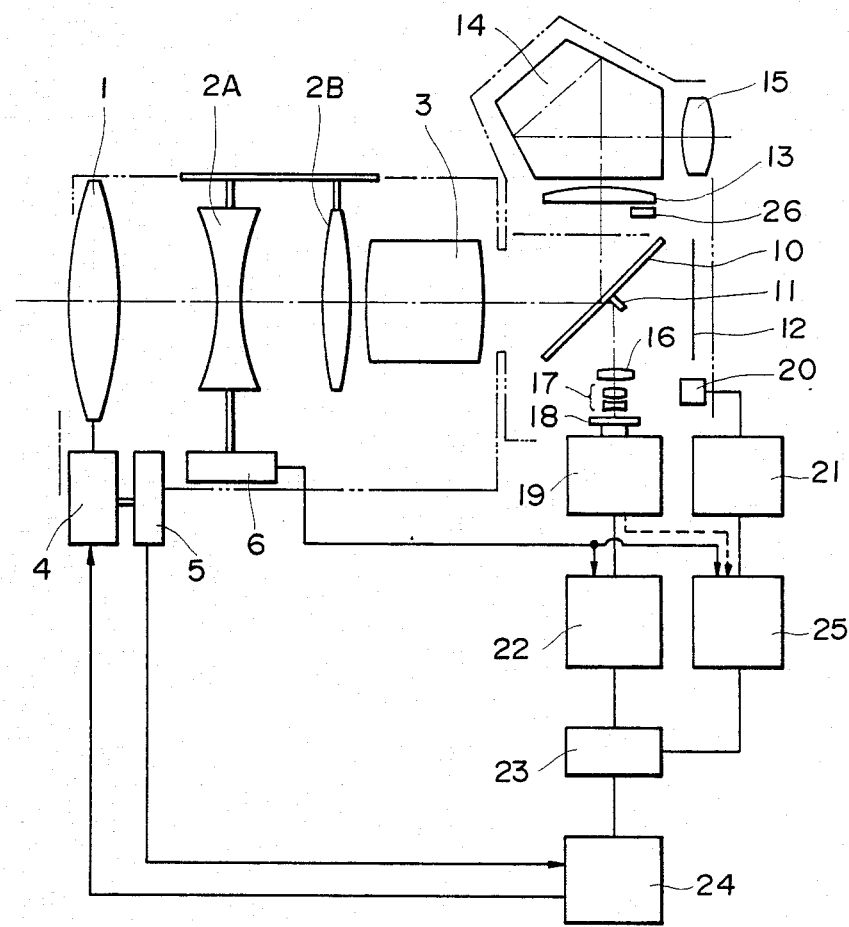
FIG. 1 is a schematic diagram of a camera in accordance with the present invention with focus control circuitry shown in block form.

A preferred embodiment of the present invention is described below in accordance with the accompanying drawings. FIG. 1 denotes a camera including a focusing lens 1 having a positive power, a variator 2A, a compensator 2B and a relay lens 3. These lenses constitute an interchangeable zoom lens and the variator 2A and the compensator 2B achieve zooming by moving in a predetermined relationship with each other. A lens driver performs focusing of the zoom lens by moving the focusing lens 1 via a connecting member, while a rotary encoder 5 detects the position of the focusing lens 1 indirectly through connection with the lens driver. A linear encoder 6 detects the focal length of the zoom lens by detecting the position of the variator lens 2A to which it is connected. While the lens driver 4, rotary encoder 5 and linear encoder 6 are shown contained within the lens barrel, they may alternatively be located on the camera body with the focal length detected via an intermediate member. Furthermore, if the lens is a single focal length, its focal length can be detected when the lens is mounted. On the camera body, there are disposed a quick return mirror 10 and a subsidiary mirror 11. The subsidiary mirror is swingably connected to the quick return mirror 10. An image receiving surface 12 may be, for example, film or a solid image pick-up element for video. The light reflected by mirror 10 passes through a condenser lens 13, a pentagonal prism 14 and an eye piece lense 15. The light transmitted through the mirror 10 is reflected by the subsidiary mirror 11 and passes through a field lens 16 disposed on an image-formation plane. A secondary optical system 17 forms a plurality of images, having parallax on a focus detection element 18 provided with a series of sensors such as a CCD for receiving a plurality of images. A focus error detection circuit 19 detects the difference between phases of the plural images from the photoelectrically converted signals of the focus detection element 18 and outputs information corresponding to the focus error of the lens. Of course, other known devices for detecting the focus state may be used, apart from the one described above.

Numeral 20 denotes a vibration detector for detecting vibration or shaking and is preferably disposed adjacent the image receiving surface 12. A known gravimeter commonly used in measuring vibrations is suitable for use as element 20. As an example, the gravimeter may measure the vibration by utilizing the property whereby the value of the resistance varies due to deflection of the retaining body of the mass point caused by its own inertia as well as expansion and contraction of a strain gauge attached to the surface of the retaining body. Numeral 21 represents a vibration signal generating circuit for outputting a vibration signal in accordance with the signal applied from the output of the vibration detector 20. Since vibration causes blurring of the image, the vibration signal is indictive of image blurring. Even if the level of the vibration is below the permissible value as compared with the operation speed of the shutter, the amount of blurring of the image both on the image receiving surface and on the focus detection element 18 varies, depending on the focal length of the optical system. For example, if the focal length is doubled, blurring or shifting of the image on element 18 is more or less doubled for a given amount of camera vibration. Thus, not only the level of vibration but also at least the focal length must be considered. However, when the exposure value EV is small, the signal accumulation or integration time of the sensors in the element 18 is prolonged, which may also adversely affect the amount of blurring. Therefore, some compensation may be provided when the EV value is small. Numeral 22 denotes a focus operation circuit which determines whether the focusing lens 1 is to be shifted or not in accordance with focus error information from the focus error detection circuit 19 and the current focal length fed from the linear encoder 6. The output from circuit 22 is input via a gate circuit 23 to drive control circuit 24 to drive the driver 4, thus shifting the focusing lens 1 toward the in-focus position. The position of the focusing lens 1 is constantly measured by the rotary encoder 5 and is fed back to the drive control circuit 24. A numeral 25 denotes a focusing judgment circuit which allows the focus to be adjusted if an evaluation value is below a reference value. The evaluation value and reference value may be obtained on the basis of the vibration information produced by the vibration signal generating circuit 21, the focal length information from the linear encoder 6 and, preferably, the accumulation time information concerning the accumulation time of the sensors in focus detection element 18 as derived from the focus error detection circuit 19. If the evaluation value does not exceed the reference value, the judgement circuit enables gate circuit 23. However, if the evaluation value exceeds the reference value, the judgement circuit 25 disables the gate circuit 23 so as to prevent the output signal of the focus operation circuit 22 from being sent to the drive control circuit 24. Simultaneously, it actuates an indicator 26 disposed within a view finder including elements 13 and 15 to visually inform the operator that the focal length of the lens is too long or the camera is being inaccurately held.

In the above described construction, if no vibration is detected, the information about the amount of shift of the focusing lens 1 detected by the focusing operation circuit 22 in accordance with the out-of focus amount detected by the focus error detection circuit 19 and the information on the current focal length provided from the linear encoder 6 is transmitted via the gate circuit 23 to the drive control circuit 24. By the output of the drive control circuit 24, the focusing lens 1 is shifted and the amount of shift of the lens, detected by the encoder 5 is fed back and, when the predetermined amount of shift is reached, the current which is supplied to the driver 4 is cut off. Herein the detection of the focus is performed again to confirm that the non-focused amount is within the permissible range and, if not, the above operation is repeated until the object is in focus.

In the presence of any vibration, the driver 4 is not actuated when the adjustment and discrimination circuit 25 issues a signal to stop the adjustment of the focus in accordance with the information about the level of vibration detected by the circuit 21 for detecting the blurring of the image and the focal distance information from the linear encoder 6 in accordance with the output of the element 20 for detecting the acceleration, since the gate circuit 23 inhibits the output of the focusing operation circuit 22 being input into the drive control circuit 24. Furthermore, since a warning is issued to the indicator 26 about the blurring, in case of the zoom lens, the user can can set the focal distance again to a shorter value or fix the camera on a tripod.

Furthermore, inhibition by the gate circuit 23 is released after a certain time has elapsed, or when the user's finger is removed from the release button.

According to the invention above described, a smooth focusing performance can be obtained by eliminating uncertain information about the focusing caused by movement of the operator's hand, while the focusing time can also be shortened. Also, once the object has come into focus, the in-focus condition can be maintained without being affected by erroneous information on the focus state.

Figure 2:
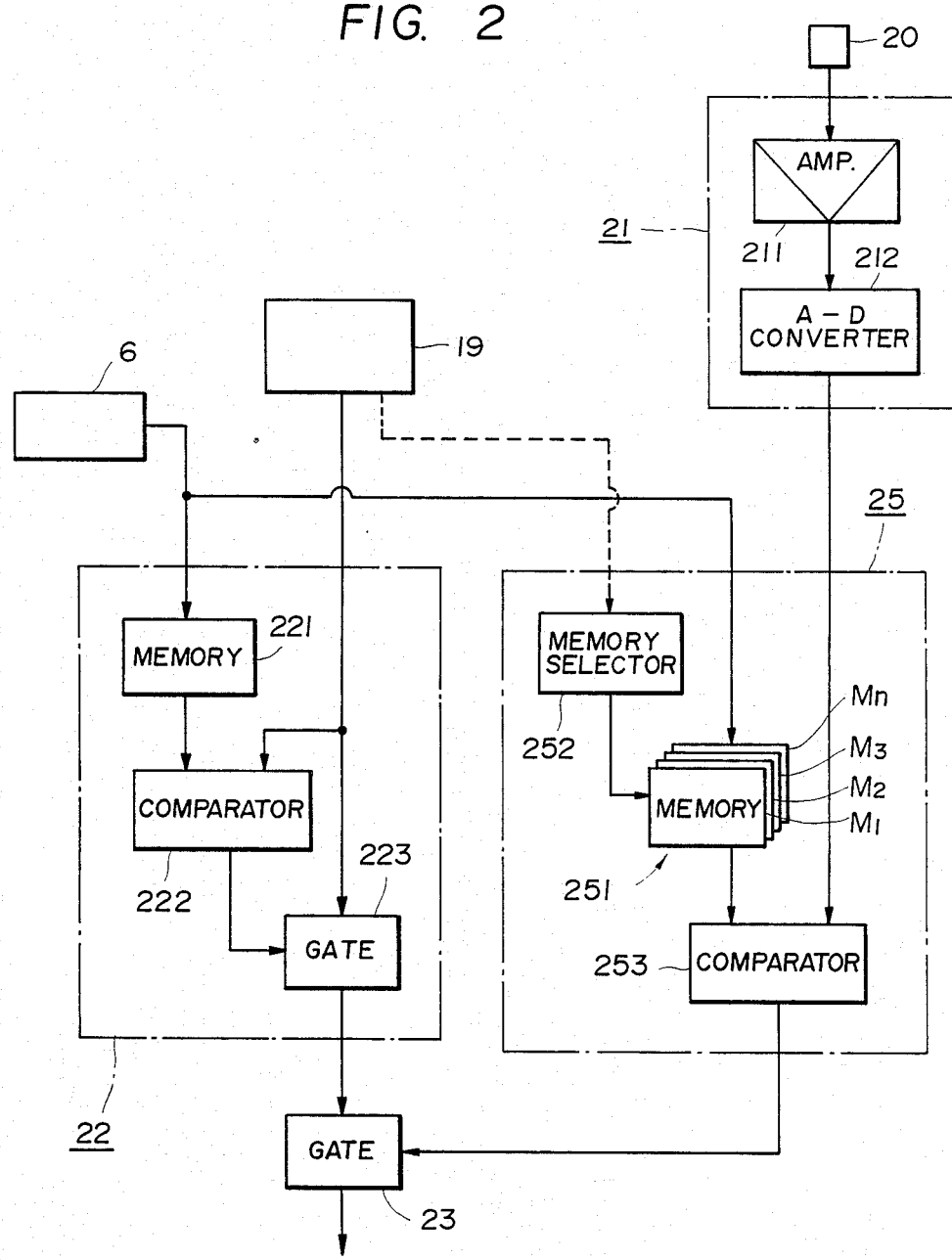
FIG. 2 is a block diagram illustrating a focusing adjustment circuit in the control circuit of FIG. 1.

FIG. 2 depicts a vibration signal generating circuit 21, a focus operation circuit 22 and a focusing judgment circuit 25. The vibration signal gerating circuit 21 includes an amplifier 211 and an analog-to-digital (A-D) converter 212. The amplifier 211 amplifies the detection output of the vibration detector 20 and the A-D converter 212 converts the analog output signal of the amplifier 211 into a corresponding digital signal.

The focusing judgment circuit 25 includes a memory unit 251, a memory selector 252 and a digital comparator 253. The memory unit 251 includes a plurality of memories $M_1$ through $M_n$ in accordance with predeterminated graded object brightness ranges. Each of the memories $M_1$ through $M_n$ stores therein digital reference data each representing a maximum permissible vibration amount for each focal length under a particular object brightness range. The memory ($M_1$, $M_2$, . . . or $M_n$) selected by the memory selector 252 outputs the corresponding data in response to digital focal length information supplied from the linear encoder 6. Each of the memories $M_1$ through $M_n$ may include a ROM (Read Only Memory). The memory selector 252 selects one of the memories $M_1$ through $M_n$ in the memory unit 251 based on which predetermined graded object brightness range the accumulation time information, supplied from an accumulation time control circuit (not shown) in the focus error detection circuit 19, falls into. The digital comparator 253 compares the output signal (digital vibration signal) from the vibration signal generating circuit 21 with the output signal (maximum permissible vibration amount signal) from the selected memory in the memory unit 251 corresponding to the current focal length under the current object brightness. The comparator 253 produces a high level signal and enables the gate circuit 23 when the vibration of the camera represented by the output signal from the vibration signal generating circuit 21 is no greater than the maximum permissible vibration determined by the output signal from the selected memory in the memory unit 251 corresponding to the focal length detected by the linear encoder 6. The comparator 253 produces a low level signal and disables the gate circuit 23 when the detected vibration is greater than the maximum permissible vibration for the current focal length.

The maximum permissible vibration amount is substantially inversely proportional to the focal length. With the same degree of camera vibration, the focus detection may be affected more seriously in the case of a long focal length than in the case of a short focal length.

Furthermore, the maximum permissible vibration amount is substantially inversely proportional to the object brightness. With the same degree of object brightness, the focus detection may be affected more seriously in the case of low brightness (a long accumulation time). As noted above, the compensation of the maximum permissible vibration amount with the object brightness (accumulation time) is optional and, of course, it is not necessary when the focus detector is of the non-accumulation type.

Each of the memories $M_1$ through $M_n$ may be arranged to store two or more distinct reference data values each for a different range of focal lengths.

The focus operation circuit 22 includes a memory 221, a digital comparator 222 and a gate 223. The memory 221 stores therein digital reference data each representing a maximum permissible focus error amount for each focal length and outputs the corresponding data in response to the focal length information supplied from the linear encoder 6. The memory 221 may include a ROM (Read Only Memory). The comparator 222 compares the output signal (digital focus error signal) from the focus error detection circuit 19 with the output signal (maximum permissible focus error amount signal) from the memory 221 corresponding to the current focal length. The comparator 222 produces a low level signal when the focus error detected by the focus error detection circuit 19 is no greater than the maximum permissible focus error determined by the output of the memory 221 corresponding to the current focal length detected by the linear encoder 6. The comparator 222 produces a high level signal when the detected focus error is greater than the maximum permissible focus error for the current focal length.

The maximum permissible focus error amount is also substantially inversely proportional to the focal length. That is, the maximum permissible focus error amount becomes small in the case of a long focal length and becomes large in the case of a short focal length.

The memory 222 may be arranged to store two or more distinct reference data values each for a different range of focal lengths.

The gate 223 responds to the output of the comparator 222 to pass therethrough the output of the focus error detection circuit 19 when the output of the comparator 222 is of high level and prevent the output of the focus error detection circuit 19 when the output of the comparator 222 is of low level.

What is claimed is;

1. A method for controlling a focus state of an optical system of a camera comprising steps of:
   detecting a focal length of the optical system;
   detecting a focus state of the optical system and, depending on a degree of out-of-focus, adjusting the focus state of the optical system;
   detecting camera vibration; and
   inhibiting adjustment of the focus state of the optical system when an amount of the detected vibration is greater than a predetermined amount for the detected focal length.

2. A method according to claim 1, further comprising the step of detecting brightness of an object image and wherein said focusing adjustment is also inhibited in accordance with the detected brightness.

3. A camera body comprising:
   means for outputting a signal for automatically focusing a lens detachably mountable on said camera body, said outputting means including focus detector means having photoelectric sensors;
   means for detecting vibration of the camera body;
   means for detecting an accumulation time of said photoelectric sensors; and
   inhibit means for receiving information on a focal length of the lens, the detected vibrations and the detected accumulation time and inhibiting output of the automatic focusing signal when an amount of the detected vibration is greater than a predetermined amount for the focal length of the lengths.

4. A method for controlling a focus state of an optical system of a camera comprising steps of:
   detecting a focal length of the optical system;
   detecting a focus state of the optical system and, depending on a degree of out-of-focus, adjusting the focus state of the optical system;
   detecting camera vibration;
   detecting an accumulation time of sensors for detecting the focus state; and
   controlling adjustment of the optical system as a function of the detected vibration, the detected focal length and the detected accumulation time.

5. A camera comprising:
   an automatic focusing device having an optical system which is focused on an object in accordance with photoelectrically converted information about the object;
   means or detecting camera vibration;
   means for detecting a focal length of said optical system; and
   control means for inhibiting a focusing operation of said focusing device when an amount of the camera vibration detected by said vibration detecting means is greater than a predetermined amount for the focal length detected by said focal length detecting means.

6. A camera according to claim 5, further comprising means or providing an indication that the focusing operation has been inhibited.

7. A camera according to claim 6, wherein said indication means provides a visual indication.

8. A camera according to claim 5, further comprising means for detecting brightness of an object image and wherein said control means also inhibits in accordance with the detected brightness.

9. A camera comprising:

an automatic focusing device having an optical system which is focused on a object in accordance with photoelectrically converted information about the object;

means for detecting camera vibration;

means for detecting a focal length of said optical system;

means for detecting accumulation time of photoelectric sensors which output the photoelectrically converted information; and control means for controlling a focusing operation of said focusing device as a function of the camera vibration detected by said vibration detecting means, the focal length detected by said focal length detecting means and the detected accumulation time.

10. A camera comprising:

a focusing lens and a zoom lens;

means for driving said focusing lens;

means for detecting a focus state of said focusing lens, and outputting a drive signal for said drive means;

means for detecting a focal length of said zoom lens;

means for detecting blur of an object image; and inhibit means for receiving the detected focal length of said zoom lens and the detected image blur and inhibiting said drive means from driving said focusing lens when an amount of detected image blur is greater than a predetermined amount for the detected focal length.

11. A camera according to claim 10, further comprsing means for providing an indication that the focusing operation has been inhibited.

12. A camera according to claim 11, wherein said indication means provides a visual indication.

13. A camera according to claim 10, further comprising means for detecting brightness of an object image and wherein said inhibit means determines the predetermined value also on the basis fo the detected brightness.

14. A camera body comprising:

means for outputting a signal for automatically focusing a lens detachably mountable on said camera body;

means for detecting vibration of said camera body; and inhibit means for receiving information on a focal length of the lens and the detected vibration and inhibiting output of the automatic focusing signal when an amount of detected vibration is greater than a predetermined amount for the focal length of the lens.

15. A camera body according to claim 14, further comprising means for providing an indication that the output of the automatic focusing signal has been inhibited.

16. A camera body according to claim 15, wherein said indication means provides a visual indication.

17. A camera body according to claim 14, further comprising means for detecting brightness of an object image and wherein said inhibit means also receives the detected brightness.

18. A camera comprising:

a focusing lens and a zoom lens;

means for driving said focusing lens;

means for detecting a focus state of said focusing lens, and calculating an operation signal for said drive means;

means for detecting a focal length of said zoom lens;

means for detecting blur of an object image;

means for detecting an accumulation time of photoelctric sensors for outputting signals for use in detecting the focus state; and inhibit means for receiving the detected focal length of said zoom lens, the detected image blur and the detected accumulation time, computing a predetermined value on the basis of the detected accumulation time and detected focal length and inhibiting said drive means from driving said focusing lens when an amount of image blur is greater than the predetermined value.

* * * * *

UNITED STATES PATENT AND TRADEMARK OFFICE
CERTIFICATE OF CORRECTION

PATENT NO. : 4,774,538

DATED : September 27, 1988

INVENTOR(S) : TOHRU KAWAI

Page 1 of 2

It is certified that error appears in the above-identified patent and that said Letters Patent is hereby corrected as shown below:

AT [57] ABSTRACT

Line 3, "atate" should read --state--.
    Line 4, "the" (second occurrence) should be deleted.

COLUMN 1

Line 8, "photograghed" should read --photographed--.
    Line 12, "Arts" should read --Art--.
    Line 17, "While," should read --While--.
    Line 28, "becom" should read --become--.
    Line 61, "means the" should read --means and the--.
    Line 65, "photolectrically coverted" should read --photoelectrically converted--.

COLUMN 2

Line 60, "lense 15." should be --lens 15.--.

COLUMN 4

Line 1, "out-of focus" should read --out-of-focus--.
    Line 27, "can can" should read --can--.
    Line 42, "gerating" should read --generating--.

COLUMN 5

Line 62, "memory 222" should read --memory 221--.

UNITED STATES PATENT AND TRADEMARK OFFICE
CERTIFICATE OF CORRECTION

PATENT NO. : 4,774,538

DATED : September 27, 1988

INVENTOR(S) : TOHRU KAWAI

It is certified that error appears in the above-identified patent and that said Letters Patent is hereby corrected as shown below:

COLUMN 6

Line 28, "vibrations" should read --vibration--.
    Line 32, "lengths." should read --lens.--.
    Line 50, "or" should read --for--.
    Line 60, "or" should read --for--.

COLUMN 7

Line 2, "a" should read --an--.
    Line 31, "comprsi-" should read --compris- --.
    Line 40, "fo" should read --of--.

COLUMN 8

Line 31, "elctric" should read --electric--.

Signed and Sealed this

Twenty-seventh Day of February, 1990

*Attest:*

JEFFREY M. SAMUELS

*Attesting Officer*    *Acting Commissioner of Patents and Trademarks*